US008543785B2

(12) United States Patent
Clinick et al.

(10) Patent No.: US 8,543,785 B2
(45) Date of Patent: Sep. 24, 2013

(54) PROTOCOL FOR MANAGED COPY OF MEDIA CONTENT

(75) Inventors: Andrew J Clinick, Issaquah, WA (US); Joerg Raymond Brown, Livermore, CA (US); John C. Simmons, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 945 days.

(21) Appl. No.: 11/460,820

(22) Filed: Jul. 28, 2006

(65) Prior Publication Data

US 2008/0028170 A1 Jan. 31, 2008

(51) Int. Cl.
*G06F 12/00* (2006.01)

(52) U.S. Cl.
USPC .................... 711/163; 711/162; 711/E12.001

(58) Field of Classification Search
USPC ................... 711/163, 164, 161, 162, E12.001
See application file for complete search history.

(56) References Cited

U.S. PATENT DOCUMENTS

| | | | | | |
|---|---|---|---|---|---|
| 5,719,937 | A | * | 2/1998 | Warren et al. | 380/203 |
| 5,844,869 | A | * | 12/1998 | Suenaga | 369/30.23 |
| 5,933,569 | A | * | 8/1999 | Sawabe et al. | 386/94 |
| 6,226,618 | B1 | * | 5/2001 | Downs et al. | 705/1 |
| 6,601,065 | B1 | * | 7/2003 | Nelson et al. | 707/781 |
| 6,789,113 | B1 | * | 9/2004 | Tanaka | 709/223 |
| 7,266,837 | B2 | * | 9/2007 | Monjas-Llorente et al. | 726/2 |
| 7,747,864 | B2 | * | 6/2010 | Fierstein et al. | 713/176 |
| 7,900,263 | B2 | * | 3/2011 | Yoshizawa | 726/26 |
| 7,958,080 | B2 | * | 6/2011 | Kumar et al. | 706/62 |
| 2002/0162112 | A1 | * | 10/2002 | Javed | 725/87 |
| 2003/0172033 | A1 | | 9/2003 | Risan et al. | |
| 2004/0156503 | A1 | | 8/2004 | Bell et al. | |
| 2004/0158871 | A1 | | 8/2004 | Jacobson | |
| 2004/0213113 | A1 | * | 10/2004 | Kim et al. | 369/53.21 |
| 2005/0060549 | A1 | | 3/2005 | England et al. | |
| 2005/0102515 | A1 | | 5/2005 | Jaworski et al. | |
| 2005/0131836 | A1 | * | 6/2005 | Armstrong et al. | 705/64 |
| 2005/0210002 | A1 | * | 9/2005 | Pal et al. | 707/3 |
| 2006/0087942 | A1 | | 4/2006 | Ahuja | |
| 2006/0090082 | A1 | | 4/2006 | Apostolopoulos | |
| 2007/0038567 | A1 | * | 2/2007 | Allaire et al. | 705/50 |
| 2008/0005802 | A1 | * | 1/2008 | Fierstein et al. | 726/27 |
| 2008/0216106 | A1 | * | 9/2008 | Maxwell et al. | 725/1 |
| 2010/0154067 | A1 | * | 6/2010 | Shimizu et al. | 726/31 |

FOREIGN PATENT DOCUMENTS

| | | |
|---|---|---|
| WO | WO2006008116 | 1/2006 |
| WO | WO2006032613 | 3/2006 |
| WO | WO2006055921 | 5/2006 |

OTHER PUBLICATIONS

Hartung et al., "Digital Rights Management and Watermarking of Multimedia Content for M-Commerce Applications", IEEE Communications Magazine, Nov. 2000, pp. 78-84.
Simitopoulos et al., "Encryption and watermarking for the secure distribution of copyrighted MPEG video on DVD", Multimedia Systems 9, 2003, pp. 217-227.

* cited by examiner

*Primary Examiner* — Pierre-Michel Bataille
(74) *Attorney, Agent, or Firm* — Lee & Hayes, PLLC

(57) ABSTRACT

Various embodiments allow for managed copies of multimedia content to be made by end users. The managed copy process can ensure that end users can make legitimate and controlled copies of content while, at the same time, give content producers the ability to control and authorize such copies.

18 Claims, 3 Drawing Sheets

PROTOCOL FOR MANAGED COPY OF MEDIA CONTENT

BACKGROUND

Multimedia content, such as movies stored on HD DVD and other media, can typically be protected from copying to ensure protection against illegal copying of the content. While this provides intellectual property protection for the copyright holder or owner of the content, it also restricts the ability of a consumer to make a legitimate copy of the content to their chosen storage media.

SUMMARY

Various embodiments provide for so-called managed copies of multimedia content to be made. The copies are said to be managed because there is a permission mechanism that is directed to ensuring that copies that are made are legitimate and authorized.

The various embodiments thus provide managed copy technology for making a copy from one content protection system to another. In order to ensure a that this copy is legitimate, the managed copy technology utilizes an infrastructure to enable the content owner or some other authority to authorize copying of the content.

DETAILED DESCRIPTION

Overview

Figure 1:
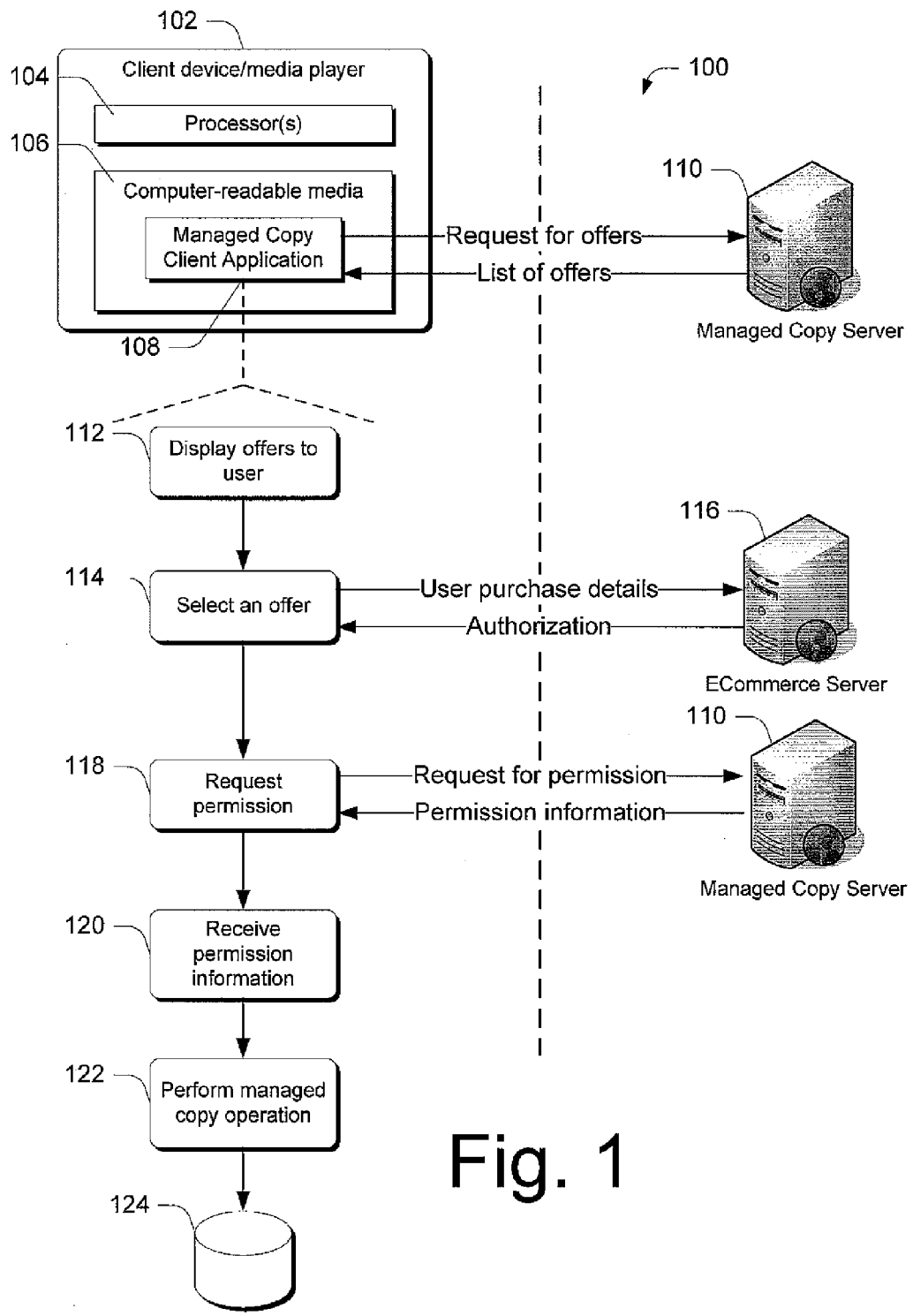
FIG. 1 illustrates, at a high level, an exemplary system in accordance with one embodiment.

Various embodiments provide for so-called managed copies of multimedia content to be made. The copies are said to be managed because there is a permission mechanism that is directed to ensuring that copies that are made are legitimate and authorized. The various embodiments thus provide managed copy technology for making a copy from one content protection system to another. In order to ensure that this copy is legitimate, the managed copy technology utilizes an infrastructure to enable the content owner or some other authority to authorize copying of the content.

In the embodiments described below, a protocol is described that allows an end user to query what particular copy offers are currently being made available for a particular media. Offers can be free or associated with a price that the consumer can pay. The protocol can allow the user to find an offer they would is like to accept, select the particular offer, and provide authorization to software running on the user's device or computer to initiate a managed copy.

It is to be appreciated and understood that the managed copy process is designed to be a flexible and extensible process that can run on a variety of devices and computers, all of which can vary in computing power and ability to display information. In at least some embodiments, data that is returned from a successful query is not bound to any particular display format. Further, the protocol allows for the ability to create a lightweight client/server request. The ability to construct a query on a computationally low powered device goes a long way to ensuring interoperability between clients and servers since many of the devices that will allow for managed copies will be consumer devices such as optical disc players, such as HD DVD players or Blu Ray players.

In addition, the interoperability of the protocols in a heterogeneous network provides a vitality that allows operating systems on the client and server to vary without adversely impacting the protocol's ability to allow for managed copies. In practice, the described protocol defines how a device can query a server to receive a list of offers that are being made available for the media that the managed copy is being attempted on, and how a server can provide authorization to the client to start the managed copy process.

In the discussion that follows, a high level overview of an exemplary process and protocol is described to give the reader a preliminary understanding of various principles associated with the managed copy process, in accordance with one embodiment. Following this, a section entitled "Implementation Example" is provided and describes but one exemplary implementation in accordance with one embodiment. It is to be appreciated and understood that the example in this section is not to be used to limit application of the claimed subject matter to any one particular implementation. Rather, other implementations can be utilized without departing from the spirit and scope of the claimed subject matter.

FIG. 1 illustrates, at a high level, an exemplary system in accordance with one embodiment, generally at 100. In accordance with one embodiment, system 100 includes one or more client device/media player 102. Any of a variety of client devices and media players can be utilized. In at least some embodiments, characteristics of such devices include the ability and functionality to play or render multimedia content, such as high definition multimedia content, for a user. By way of example and not limitation, such high definition multimedia content can include that which is renderable by a Blu-Ray player or HD DVD content that is renderable on a HD DVD player. Other types of content can be utilized, as will be appreciated by the skilled artisan. These other types of content can include, by way of example and not limitation, digital music, electronic books. Further, such content can include streaming content, such as broadcast content, IP television and the like and/or the means and instrumentalities to view such content, such as license information, decryption keys, rights and the like. Thus, not only can content itself be transferred from one content protection scheme to another, but license or rights information can be transferred from one device to another in the same content protection scheme.

Client devices and media players that can be utilized in the described embodiments typically have one or more processor(s) 104 and one or more computer-readable media 106, such as some type of hard disk, ROM and/or RAM. In this embodiment, a so-called managed copy client application 108 (also referred to below as a "managed copy machine") is embodied on the computer-readable media 106. Although the application 108 is depicted as software which resides in the form of computer-readable media, the functionality provided by the application can be implemented in connection with any suitable hardware, software, firmware or combination thereof The managed copy application is configured to implement the functionality that is described just below.

Other components of system 100 include one or more servers which, in this particular example, include a managed copy server 110 and some type of ECommerce or commercial/business server 116.

In accordance with one embodiment, one basic premise for managed copying and the use of the protocols to be described below is that the client requesting the managed copy makes a request to a server. Here, a request for offers is made on the managed copy server 110. This request provides information about the media being sought to be copied (such as a HD DVD) and the device that is requesting the managed copy. In one embodiment, this request is in a standard web service request, typically over HTTP, and will result in a response from the server which will contain all the information for the offers that are available for the media. Here, this response is represented as a "list of offers".

In accordance with one embodiment, the data in the response is encapsulated in an offers XML document that conforms to the offers XML schema, an example of which is provided below. The offers XML schema ensures that, irrespective of the operating system of the server, the client will be able to interpret and display the data being returned, as depicted at 112. In accordance with one embodiment, the XML schema for the offers that are available is utilized for a number of different purposes. First, the schema encapsulates information about the offers that are available for the media identified in the request. In addition, the schema provides "hints" to the client device as to how to render the data.

Rendering data is an important part of the managed copy procedure since it is the primary interface that will be provided to the user from which he or she will purchase or otherwise select the managed copy. To ensure that the managed copy solution can be implemented on a variety of players and computers, in this particular embodiment, the offers data contains no screen layout details since the form factor and capabilities of each player can and will be different. This, however, does not exclude the possibility of including screen layout details. Rather, flexibility in some embodiments is enhanced by not including the screen layout details. By providing only the data for rendering, the client device can choose a display format that meets the capabilities and user interface paradigm of the client. However, since this is the primary interface to the user, it can be important that the content producers have the ability to provide information that will assist with branding the experience. As such, the offers schema allows for images to be specified by the organization making the offer and also on a per offer basis.

Typically, though not always, a managed copy will involve a commercial transaction of some form, such as when a user selects and purchases an offer as depicted at 114. This transaction can utilize a user interface that is provided by a third party server or service, such as ECommerce server 116. This user interface allows the user to enter purchase information, such as credit card details and the like. Providing a client-side rendering capability allows for the client to not only display the user interface in a manner that will work with the commercial transaction, e.g. by enabling communication with a web server to pass credit card information, but provides the content owner or other third party with the ability to provide a richer branded experience. Since this is a mechanism that is designed to work across a heterogeneous environment, in at least some embodiments, the schema itself provides no user interface capabilities. It does, however, provide for rendering applications to be attached to the data or referenced so the client device can download a rendering application that is appropriate for the included data and use the application to render the data. So, for example, the third party ECommerce Server might include a reference to a rendering application, as well as renderable data, that provides a uniquely branded user interface through which the user can execute his or her purchase.

As noted above, the managed copy process is intended to and does work on a number of different client devices, such as HD DVD players and Blu Ray players As will be appreciated by the skilled artisan, these players provide very different interactivity platforms. As such, the rendering capability is specified in the schema in the form of URI to the application that will run on the relevant platform. A managed copy server can change the render value depending on what type of request it receives. For example, for an HD DVD request, the render attribute value can point to an ACA file that includes an advanced application that will be run on the HD DVD player. On a Blu-Ray player, the render attribute value can be a URI to a jar file which can include a BD-J application.

In the illustrated and described embodiment, the render application communicates to the managed copy application via application program interfaces or API's provided or exposed by a conforming managed copy implementation. There are other rendering options, however. For example, since the data returned is standard XML, the player may also choose to utilize an XSLT stylesheet which can be referenced in the standard XML mechanism. If an XSLT is specified and the player supports client side XSLT transforms to HTML and an HTML browser, the offers user interface can be presented using HTML. Of particular note, in this embodiment, the API's allow rendering applications to query the managed copy application that invoked them to get the XML returned from the request for offers call.

As but one example of XML data that is returned from the managed copy server 110 responsive to a request for offers call, consider the following.

```
<?xml version="1.0"?>
<offers  xmlns:xsi="http://www.w3.org/2001/XMLSchema-instance"
render="http://www.wb.com/hp/mc/HP.aca"  version="1.23"
xsi:noNamespaceSchemaLocation="http://www.aacs.org/schemas/offers.xsd">
    <offer>
        <title>Harry Potter I</title>
        <link>http://www.wb.com/hp/mc</link>
        <abstract>A short piece about a wizard</abstract>
        <description>A long piece about a wizard</description>
        <image>
            <url>http://www.wb.com/hp/mc/mainimage.png</url>
            <title>Harry Potter Image</title>
        </image>
        <language>en-us</language>
        <mcot>something useful about mcot here</mcot>
            <availability   end="1/12/2006" start="4/12/2005"></availability>
        <price>$1</price>
    </offer>
    <offer>
        <title>Harry Potter I and II</title>
        <link>http://www.wb.com/hpII/mc</link>
        <abstract>A short piece about a wizard</abstract>
        <description>A long piece about a wizard</description>
        <image>
<url>http://www.wb.com/hpII/mc/mainimage.png</url>
            <title>Harry Potter II Image</title>
        </image>
        <language>en-us</language>
        <mcot>something useful about mcot here</mcot>
            <availability   end="1/12/2006" start="4/12/2005"></availability>
        <price>$1</price>
    </offer>
</offers>
```

In this particular example, the <offers> tag encapsulates all of the information associated with one or more offers. At the top of the XML, a "render" attribute specifies a URI to a rendering application file for the particular offers that are described. In this particular example, there are two referenced offers (encapsulated by the <offer> tag)—one for Harry Potter I and one for Harry Potter I and II each of which is encapsulated in a <title> tag inside an associated <offer> tag. In addition, inside each <offer> tag is a <link> tag associated with a link from which the offer can be purchased or acquired, an tag that provides a short abstract on the title, a <description> tag that provides a description of the title, an <image> tag which can contain a link to an image that should be displayed with the offer for branding and other purposes, a <language> tag that references a language associated with the offer, an <mcot> tag which is associated with a digital rights management scheme associated with the offer and described in more detail below, an <availability tag> that describes the availability of a particular offer and a <price> tag that describes the price of a particular offer.

In operation, the managed copy application 108 running on the player provides a user interface, through the referenced rendering application if provided, and the user makes their offer selection via the user interface. When the user chooses to buy the offer the managed copy application 108 communicates to the relevant ECommerce web site, via the ECommerce server 116, using the Urn which is provided in the offer XML.

Once a valid authorization has been received by the client device proving that the commercial transaction is complete, the client device can make a request, as at 118, to a request permission web service. The request includes appropriate parameters that are used in the permission-granting process, examples of which are provided in the "Implementation Example" section below. The result of this call returns XML that conforms to a permission schema, as at 120. The permission schema provides all the information that is utilized to make the copy of the content from the media to the user store.

As but one example of such a schema, consider the following.

```
<permission xmlns:xsi="http://www.w3.org/2001/XMLSchema-instance"xsi:noNamespaceSchemaLocation="http://www.aacs.org/schemas/permission.xsd">
    <status>true</status>
    <mcotInfo>string</mcotInfo>
    <dealManifest>string</dealManifest>
    <signature>B64BINARY</signature>
</permission>
```

The components of this instance of the schema are described in detail in the "Implementation Example" section just below. Once the permission data has been received from the server, the managed copy application 108 extracts the relevant information from the schema and uses it to perform the managed copy, as at 122, from the media to some type of other media, such as a user store 124.

In practice, the above system and process can be thought of as having different sub-processes that are interesting to consider. The first sub-process is the offering process—i.e. the mechanisms and instrumentalities that enable a user to query and receive back a list of offers for a particular media. The second sub-process is the authorization process in which the user can select a particular offer and receive back an authorization to purchase or acquire the offer. The third sub-process is the permissioning process and its related copying process in which copy permission is granted and the managed copy application makes the authorized copy. It is during the copying process that the media can be copied from one digital content protection technology to another protection technology and thus bound to a particular playback device, set of playback devices, or media. Specifically, during the information exchange between the managed copy application and the managed copy server, so-called opaque information can be passed to the server and back to the managed copy application so that the copy process can effectively bind the copy to a particular media, such as a drive, disc and the like. This will become apparent in the discussion below.

Implementation Example

The implementation example about to be described is utilized in connection with the Advanced Access Content System (AACS) specification ("Advanced Access Content System (AACS) Pre-recorded Video Book", version 0.91, Feb. 17, 2006), which defines an advanced, robust and renewable method for protecting entertainment content, including high-definition audiovisual content. It is to be appreciated and understood that this implementation example is provided to give the reader some context and understanding of but one system in which the inventive embodiments can be employed. As such, systems other than those that conform to the AACS specification can be utilized without departing from the spirit and scope of the claimed subject matter.

Content protected by AACS includes an offer for the consumer to make at least one additional copy of that content after receiving appropriate authorization. That copy can be up to a full resolution "bit for bit" copy of the original content and can also include other offers where only certain portions of the original content are included in the copy. There may be additional offers available and for the purposes of this implementation example, the term "Managed Copy" means a copy of the content that has been made subject to external authorization using the process defined below.

For the sake of clarity in this section, a definition of relevant terms is given as follows:

| Term | Definition |
| --- | --- |
| Content ID | The Content ID identifies the content to the Remote Server in an on-line transaction. The Content ID contains a registered number obtained from ISAN (International Standard Audiovisual Number). |
| Default URL | A URL to be used for locating a Managed Copy Server for media which does not contain a valid Managed Copy URL. The Default URL is embedded into Managed Copy Machines for this purpose. |
| Managed Copy Output Technology or (MCOT) | Refers to a technology capable of protecting a Managed Copy that is listed as an AACS Approved Digital Copy Method on Table C1 of the License Agreement. |
| Managed Copy Machine or (MCM) | Consumer software or hardware which performs a Managed Copy. It may be tied to a Licensed Player, or it may exist as a standalone application - e.g. as part of a home media server |
| Managed Copy Server or (MCS) | Remote computer that provides authorization to MCM's to make Managed Copies. The appropriate MCS for a particular Title will be identified by an URL that will be contained on the media to be copied |
| Managed Copy Unit or (MCU) | Particular offer that is made available as a part of the offers retrieved from the MCS or which reside on the media |
| PMSN | Pre-recorded Media Serial Number; a unique identifier for each piece of media. |
| Serial Number | This is a string provided to the managed copy server to identify the particular disc being copied. If the disc includes |

| Term | Definition |
|---|---|
| | one, this is the PMSN. Otherwise, it is a human readable equivalent to a PMSN, entered by the User. The Serial Number may be omitted. |
| License | In general, a License is a cryptographically calculated, but not secret bit string that makes a Managed Copy playable. The syntaxes of the Licenses vary by MCOT. For example, a license might be a token signed by the MCOT's licensing agency. In the case of the AACS recordable media, the license is one or more MACs on the media ID. An essential characteristic of a License is that it binds the copy to a particular destination - a device, a piece of media, or an instance of software. In some cases a License may be implicit: for example, a portable device with an embedded MCM and with captive storage may have a License to play simply by having the copy in the captive storage. |
| Client-side Binding | In a transaction using Client-side Binding, the MCM will contain the cryptographic keys to rebind the content from the AACS pre-recorded format to the appropriate format for the destination (the MCOT). In other words, whatever License the MCOT needs to make the copy playable is generated by the MCM itself |
| Server-side Binding | In a transaction using Server-side Binding, the MCM counts on the Managed Copy Server to produce the License. Such an MCM might not need any cryptographic keys or other secrets. Of course, if the destination MCOT requires that the AACS content be re-encoded or re-encrypted, then the MCM would still need cryptographic keys. |

Figure 2:
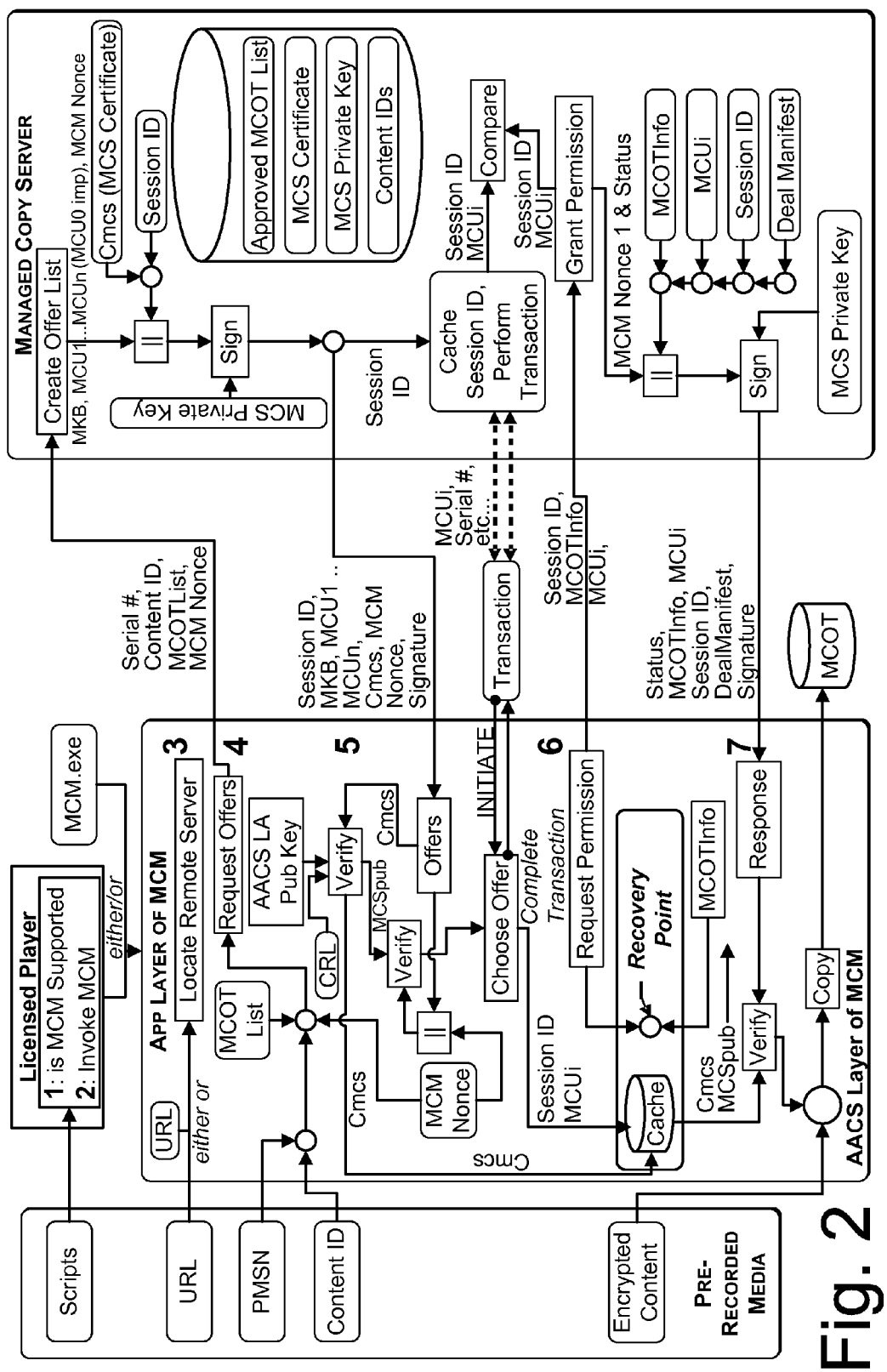
FIG. 2 illustrates an overview of a managed copy process in accordance with an implementation example.

FIG. 2 illustrates an overview of the Managed Copy process in accordance with the implementation example. This figure is used throughout the remainder of the description in this section. In this example, three different components of the process are depicted—the pre-recorded media, the licensed player (having the managed copy machine (MCM)), and the managed copy server. The pre-recorded media can include various information and data such as scripts, an URL to the managed copy server, a pre-recorded media serial number (PMSN), a content ID and encrypted content.

When making a Managed Copy, the MCM first connects to a MCS to obtain a list of the available offers and to obtain authorization and permission. The URL contained on the media identifies the MCS to be used for obtaining this authorization. In the event that no Managed Copy URL is contained on the media, the MCM uses the Default URL to locate the MCS to be used. The MCM provides to the MCS the Content ID contained on the media.

The MCM can either be activated directly as a standalone application or it can be invoked via the menuing system contained within the scripts on the media to be copied. Assuming the MCM is activated via the menuing system, the MCM will follow the steps outlined below. If it is being activated as a standalone application, then the MCM will being at step 3. The description below generally follows the enumerations that appear in FIG. 2. The description that follows starts first with a high level walk through of an exemplary process. Following this, several sections appear and specifically describe, in detail, various managed copy messages that are utilized in the high level walk through.

Step 1

The menuing system, through the scripts on the pre-recorded media, calls the API "IsMCMSupported" to determine if the Licensed Player contains the ability to make a Managed Copy. If the response is false, then the process terminates.

Step 2

The menuing system calls the APT "InvokeMCM" which will transfer control to the MCM.

Step 3

The MCM uses the URL contained on the media to identify which MCS will be used to obtain authorization to make the Managed Copy.

Step 4

The MCM formulates a "Request Offer" message as described below, to be sent to the MCS as a means to request what Managed Copy offers are available. This message includes a nonce to mitigate replay attacks or modification of session information in the offer response.

Step 5

The MCS formulates the list of Managed Copy offers that are available and sends them to the MCM using the AACS defined web service. This session information and the nonce received from the MCM in step 4 are signed by the MCS. The session ID can be used to not only identify the session, but can also be used to detect one or more attacks. For example, if the session ID has been manipulated or is missing from subsequent communications, such may detect an attempted attack.

Step 6

After verifying the status of the MCS and the integrity of the message, the MCM displays the Managed Copy offers to the user, using either its own custom display, an application referenced in the offers message, or an XSLT-generated web page.

Once the user has selected an offer and completed any required transactions with the MCS, the MCM sends a "Request Permission" message as described below. Note that caching of the Session ID, the MCUi and the MCS Certificate provides the MCM with a recovery mechanism or recovery point. In addition, in at least some embodiments, recovery points are created before a transaction server can be contacted.

Step 7

The MCS verifies the correctness of the values contained in the Request Permission message by comparing them to the values contained in previous transactions and if they are correct and all conditions have been met, then the MCS formulates a cryptographically secure response to the MCM that will indicate authorization to make the Managed Copy as described below.

An MCM using Client-side Binding will verify the integrity of the response message and if all conditions are met as described below, then it will make the Managed Copy and its associated License. An MCM using Server-side Binding will use the MCOTinfo in the response message to extract the License and include it with the copy. Such an MCM is not required to verify the integrity of the response or of the License—in fact, the License can be opaque to the MCM.

The following sections describe the various managed copy messages and provide additional information to supplement the overview provided by FIG. 2. During this discussion, it will be helpful to reference FIG. 2 at various places.

Request Offer

When a MCM is seeking to make a Managed Copy, the "Request Offer" message is the first message sent to the MCS.

The Request Offer message is a web service message which uses the offer schema that contains the following information:

| | |
|---|---|
| Serial Number (optional) | The Serial Number may be sent to the MCS to identify the specific instance of media for which the copy is being requested. The MCS can use the Serial Number to determine what offers remain available for this media. If the PMSN is included on the disc, then the Serial Number is the PMSN, and it must be sent to the MCS as part of the Request Offer message. If the PMSN is not included on the disc, then the Serial Number does not need to be passed to the MCS as part of the Request Offer Message. |
| Cid | Content ID. This must be provided to the MCS since it is needed to identify the content, and therefore the offers which are available. |
| MCOTList | This is an array of Managed Copy Output IDs (MCOT IDs) that are supported by the MCM. Each of the formulated offers (or MCU's) that are returned will specify which MCOT will be used as the output technology for that offer. |
| mcmnonce | Managed copy machine generated nonce (or 0 if the MCM is using Server-side Binding). This will be used in processing the Offer Response message to prevent replay attacks when the MCM is using Client-side Binding. Such an MCM shall retain a cached copy of the mcmnonce for comparison with the nonce value received back from the MCS in the Offers Response message. |

The response from this request is an ML object containing the offers available for this particular disc.

Cryptographic Signature of Managed Copy Offer Response

The MCS Certificate is sent to the MCM and after it has been validated by the MCM, the MCM uses the public key contained within the MCS Certificate to verify the signature of the Managed Copy Offer and Permission Response messages. An MCM using Server-side Binding ignores the MCScert and the signature on the Permission Response Message.

The Managed Copy Server (MCS) applies a cryptographic signature to the Session ID and mcmnonce. In the case of Client-side Binding, the AACS Layer can use this signature to detect replay attacks or attempts to modify the Session ID or MCUi on the wire.

When an MCM using Client-side Binding receives the Offer Response message from the MCS, it verifies the message as follows. First, the MCM verifies the integrity of the MCS Certificate and refuses to allow the Managed Copy process to continue if the signature fails to verify. Second, the MCM verifies that the MCS Certificate has not been revoked. If the MCS Certificate has been revoked, the MCM refuses to allow the Managed Copy process to continue. Next, the MCM verifies the integrity of the Offer Response Message and refuses to allow the Managed Copy process to continue if the signature fails to verify. Finally, the MCM verifies that mcmnonce is the same nonce value that was transmitted to the MCS in the Request Offer message and refuses to allow the Managed Copy process to continue if the nonce values are not the same.

Display of Managed Copy Offers

In accordance with this implementation example, the MCM can display the offers in one of three distinct ways: (1) using its own custom display based upon an XML schema, (2) using an optional XSLT provided with the offers to create an HTML representation of the offers, or (3) downloading and unpacking an optional archive file included in the offers message, and using that application to render the offers.

Request Permission

Once the appropriate offer has been selected by the user, the MCM sends a Request Permission message to the MCS. The Request Permission message is a web service message which uses a permission schema such as the one described above. The Request Permission message is executed synchronously with the Permission Response returned and contains the following information:

| | |
|---|---|
| MCUi | Managed Copy Unit. A string containing the ID of the particular offer that was selected as a part of the transaction. If no offer was selected, the MCUi must be a null string.. |
| session id | Contains the Session ID that was returned in the XML object in response to the Request Offers message. This Session ID is used by the MCS to correlate this Request Permission message to any transactions that occurred as a result of selecting a particular offer. |
| MCOTInfo | Information sent to the MCS which is MCOT specific. It is optional in the case of Client-side Binding; in the case of Server-side Binding, it contains the binding information to be placed in the License. For example, it might contain the media ID if the MCOT is a recordable disc. |

Permission Response Creation

When the MCS receives a Request Permission message, the contents of the message are compared to the information received in the initial Request Offer message and any subsequent transactions that occurred. If all the information is correct and the conditions have been satisfactorily met, the MCS will compose a "Permission Response" message to be sent to the MCM. The Permission Response message is, in this embodiment, a web service message using the permission schema mentioned above. It contains the following information:

| | |
|---|---|
| Status | Indicates whether or not permission has been granted to make the copy. In an MCM using Client-side Binding, this status field shall only be used by the AACS Layer after all message integrity checks have been completed. This status field can also be used to facilitate the Application Layer's ability to determine the authorization status. |
| MCOTInfo | Information sent to the MCM which is output technology specific. It is optional in the case of Client-side Binding. In the case of Server-side Binding, it shall contain the License from the server. |
| dealmanifest | (Optional) the deal manifest will contain format specific information that corresponds to the MCOT and the MCU that was selected such that the MCM can determine exactly what needs to be copied when performing the copy to the destination media. |
| signature | The Managed Copy Server (MCS) applies a cryptographic signature to the message which can be used, in the case of Client-side Binding, by the AACS Layer to determine if the copy has or has not been authorized. |

Permission Response Validation

When an MCM using Client-side Binding receives the Permission Response message from the MCS, it determines whether the requested copy has been authorized using the following process. First, the MCM verifies the integrity of the Permission Response Message and refuses to allow the Managed Copy process to continue if the signature fails to verify. Next, the MCM verifies that the Session ID contained with permissionSignedContent matches the Session ID stored in the local MCM cache. If it does not, the MCM does not perform the described managed copy. Next, the MCM verifies that the MCUi contained with permissionSignedContent matches the MCUi stored in the local MCM cache. If it does not, the MCM does not perform the described managed copy. Further, the MCM determine if authorization to make the Managed Copy has been granted by verifying that the Status field of the Permission Response message is equal to true.

An MCM using Server-side Binding moves the License in the MCOTinfo in the Permission Response to the output copy, but has no obligation to check the License or the rest of the response message.

Making a Managed Copy

Once a Client-side Binding MCM has validated the Permission Response, or a Server-side Binding MCM has extracted the License from the MCOTinfo, the can be made to the selected MCOT. The copy is bound to the destination media using a binding method defined by the MCOT.

The MCOTInfo and Deal Manifest that is returned by the MCS in the Permission Response message contains any MCOT specific information required by the selected MCOT to successfully bind the content to the destination media.

Exemplary Method

Figure 3:
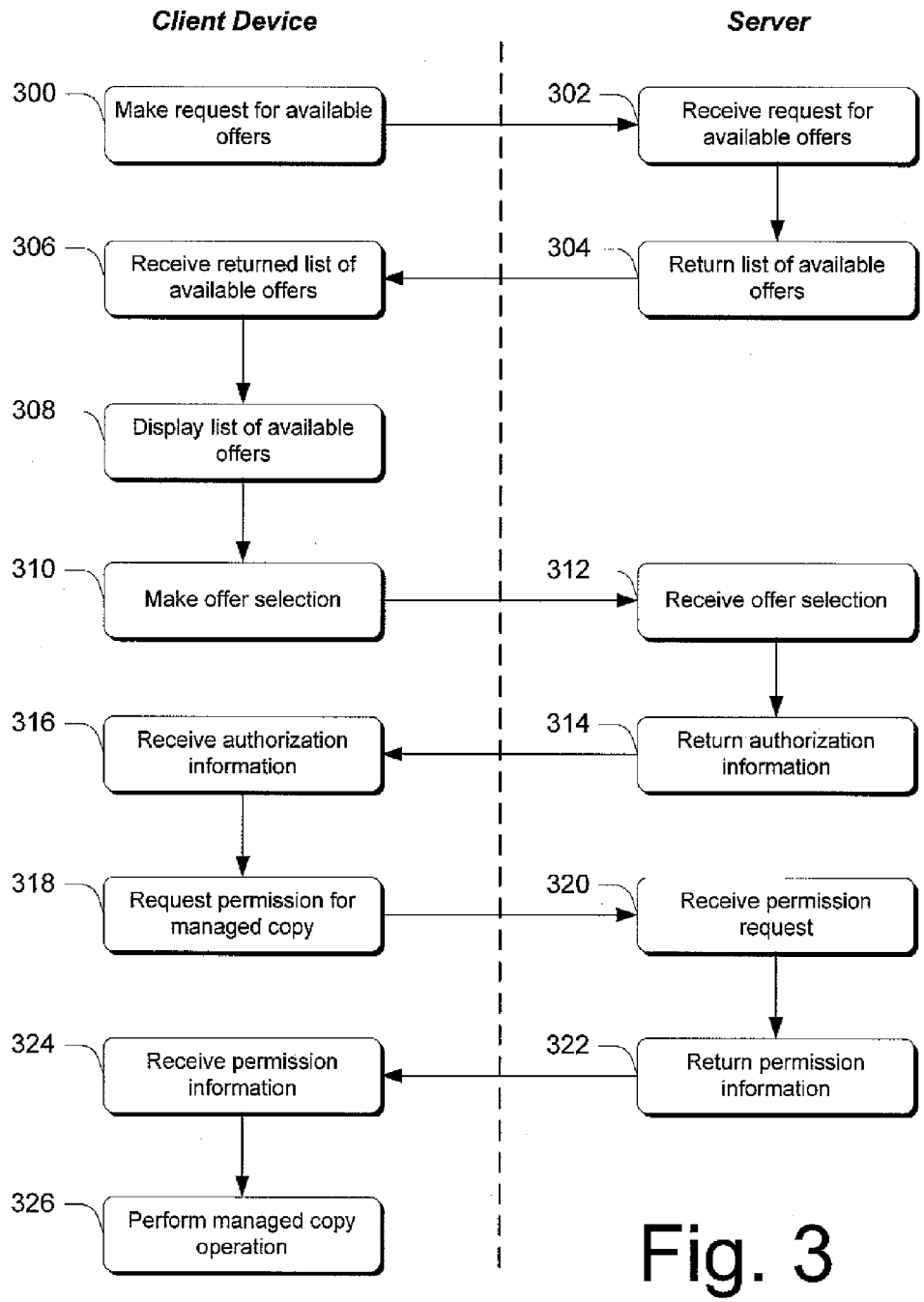
FIG. 3 is a flow diagram that describes steps in a method in accordance with one embodiment.

FIG. 3 is a flow diagram that describes steps in a method in accordance with one embodiment. The method can be implemented in connection with any suitable hardware, software, firmware or combination thereof. In at least some embodiments, the method can be implemented in connection with systems, such as those systems shown and described above.

In the discussion that follows, various steps of the method are shown as being performed either by a client device, such as those described above, or a server, such as those described above.

Step 300 makes a request for available offers. Examples of how this can be performed are given above. Step 302 receives the request for available offers and step 304 returns a list of available offers. Examples of how this can be done are described in detail above. Step 306 receives the returned list of available offers and step 308 displays the list of available offers. Examples of how this can be done are given above.

Step 310 makes an offer selection and step 312 receives the offer selection. Examples of how this can be done are provided above. Step 314 returns authorization information to the client device and step 316 receives the authorization information.

Step 318 then requests permission for a managed copy. Examples of how this can be done are given above. Step 320 then receives the permission request and step 322 returns permission information to the client device.

Step 324 receives the permission information and step 326 performs the managed copy operation in accordance with the permission information that was received.

CONCLUSION

Various embodiments allow for managed copies of multimedia content to be made by end users. The managed copy process can ensure that end users can make legitimate and controlled copies of content while, at the some time, give content producers the ability to control and authorize such copies.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
   making a request, by a client device, to a server device, for available copy offers for making a copy of multimedia content stored on first media of the client device;
   receiving, by the client device, from the server device in response to the request, a list of available copy offers, wherein the list of available copy offers is formatted according to a markup language;
   displaying the list of available copy offers for user selection;
   receiving a user selection of a copy offer from the list of available copy offers;
   responsive to receiving the user selection of the copy offer, the client device receiving authorization information from the server device;
   using the authorization information, the client device requesting permission to make a copy associated with the selected copy offer;
   receiving from the server device, permission information based on the selected copy offer, wherein copy permission is granted by the server device based on the selected copy offer and the authorization information; and
   responsive to receiving the permission information based on the selected copy offer, performing a managed copy operation to copy the multimedia content from the first media of the client device to second media of the client device.

2. The method of claim 1, wherein the act of making a request comprises including, with the request, a nonce to mitigate replay attacks or modification of session information.

3. The method of claim 1, wherein the markup language is an extensible markup language (XML).

4. The method of claim 3, wherein the XML list conforms to a schema that contains a reference to at least one of:
   a rendering application for rendering a user interface,
   a title associated with the offer,
   a link associated with the offer,
   an image associated with the offer, or
   a content protection scheme.

5. The method of claim 1, wherein:
   the act of receiving the list comprises receiving a session ID to identify a particular session; and
   the act of requesting permission comprises including the session ID with a request for permission.

6. The method of claim 1, wherein the act of receiving permission information comprises receiving the session ID with a permission grant.

7. The method of claim 1, wherein said act of receiving the list comprises receiving a reference to a rendering application that can be used to render a display of the list.

8. The method of claim 1, wherein the act of receiving permission information comprises receiving extensible markup language (XML) information that conforms to a permission schema.

9. The method of claim 8, wherein the permission schema contains a reference to at least one of:
   a permission status,
   a content protection scheme,
   a deal manifest, or
   a signature.

10. The method of claim 1, wherein the authorization information indicates that a commercial transaction associated with the selected copy offer is complete.

11. A computer-implemented method comprising:
receiving, by a computing device, a request for available copy offers for copying multimedia content controlled at a client device;
returning, in response to the request, a list in extensible markup language (XML) of one or more available copy offers, the one or more copy offers including at least one of:
an offer to make a full resolution copy of the multimedia content; or
an offer to make less than a full resolution copy of the multimedia content;
receiving a request for permission to make a copy associated with a selected copy offer;
granting copy permission based on the selected copy offer; and
returning permission information corresponding to the permission request to permit the client device to make a copy of the multimedia content controlled at the client device in conformance with the copy permission granted based on the selected copy offer.

12. The method of claim 11, wherein the act of returning permission information comprises returning XML information that conforms to a permission schema.

13. The method of claim 11, wherein the act of returning the list comprises including a signature for verification and a session ID that is to be used to identify a particular session, wherein the session ID can be used to detect one or more attacks.

14. The method of claim 13, wherein the act of returning the permission information comprises including a signature and the session ID.

15. A system comprising:
one or more processors;
one or more computer-readable media; and
a managed copy application on the one or more computer-readable media which, when executed, cause the one or more processors to:
enable a user to query and receive back, from a remote computing device, an extensible markup language (XML) list of copy offers, the list of copy offers providing multiple offers for permitting the user to make a copy of a particular multimedia content stored at the client device, the multiple copy offers including at least one of:
an offer to make a full resolution copy of the particular multimedia content;
an offer to make a less-than-full-resolution copy of the particular multimedia content; or
an offer to make a copy of only certain portions of the particular multimedia content;
implement an authorization process in which the user selects a copy offer from the list and receives back, from the remote computing device, an authorization to purchase or acquire the copy offer; and
implement a permissioning process and a related copying process in which copy permission is granted by the remote computing device, based on the selected copy offer and the authorization to purchase or acquire the copy offer, and an authorized copy of the particular multimedia content stored at the client device is made by the client device to a particular media at the client device in conformance with the copy permission granted based on the selected copy offer.

16. The system of claim 15, wherein the copying process copies the particular multimedia content from one digital content protection technology to another digital content protection technology that is individualized to the particular media to which the content is copied.

17. The system of claim 15, wherein the list of offers, authorization process, and permissioning process utilize a session ID, wherein the session ID can be used to detect one or more attacks.

18. The system of claim 15, wherein:
the particular multimedia content is stored at the client device on an optical disc, and
the authorized copy of the particular multimedia content is made by copying from the optical disc to the particular media.

* * * * *